Nov. 6, 1951  D. A. WHITMAN ET AL  2,573,885
UNDERWATER CAMERA AND CASING, INCLUDING CONTROL MEANS
Filed April 7, 1948   3 Sheets-Sheet 1
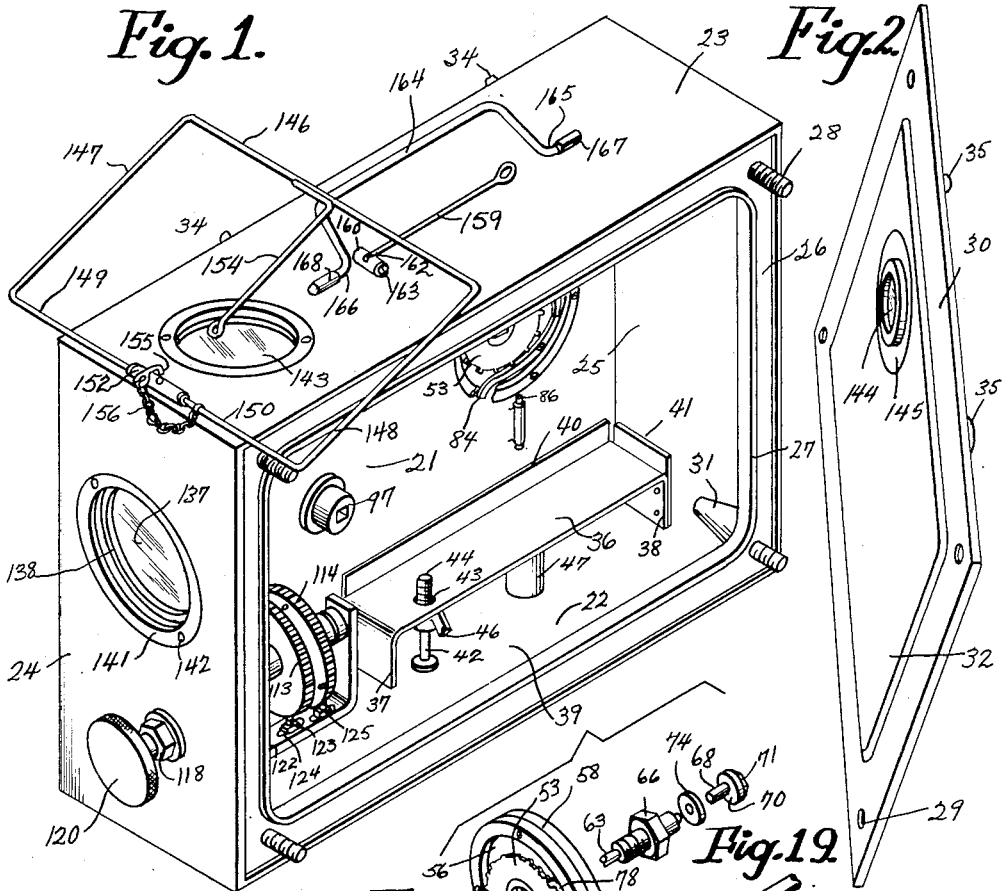
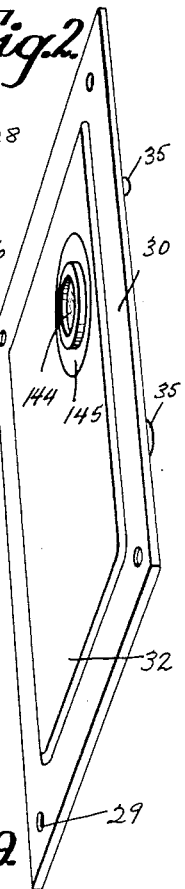
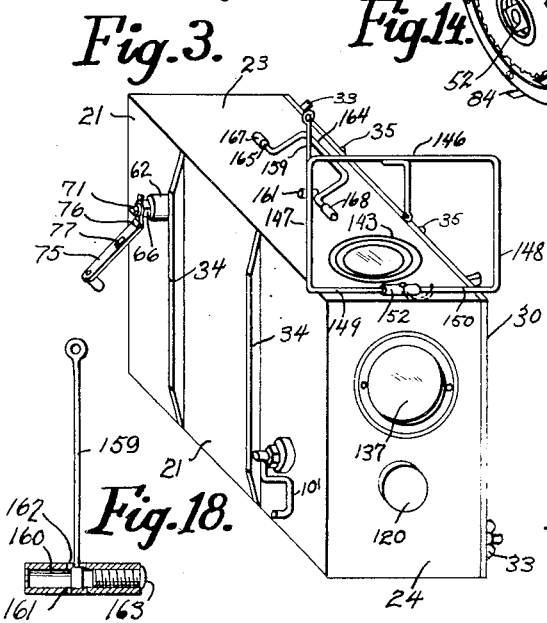
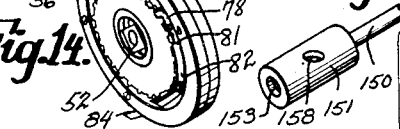
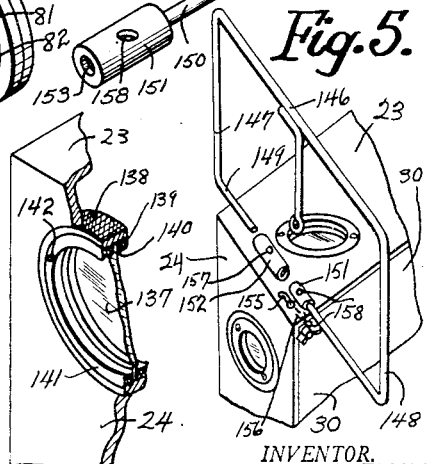
INVENTOR.
DUDLEY A. WHITMAN
& WILLIAM F. WHITMAN
BY Wilkinson & Mawhinney
ATTORNEYS

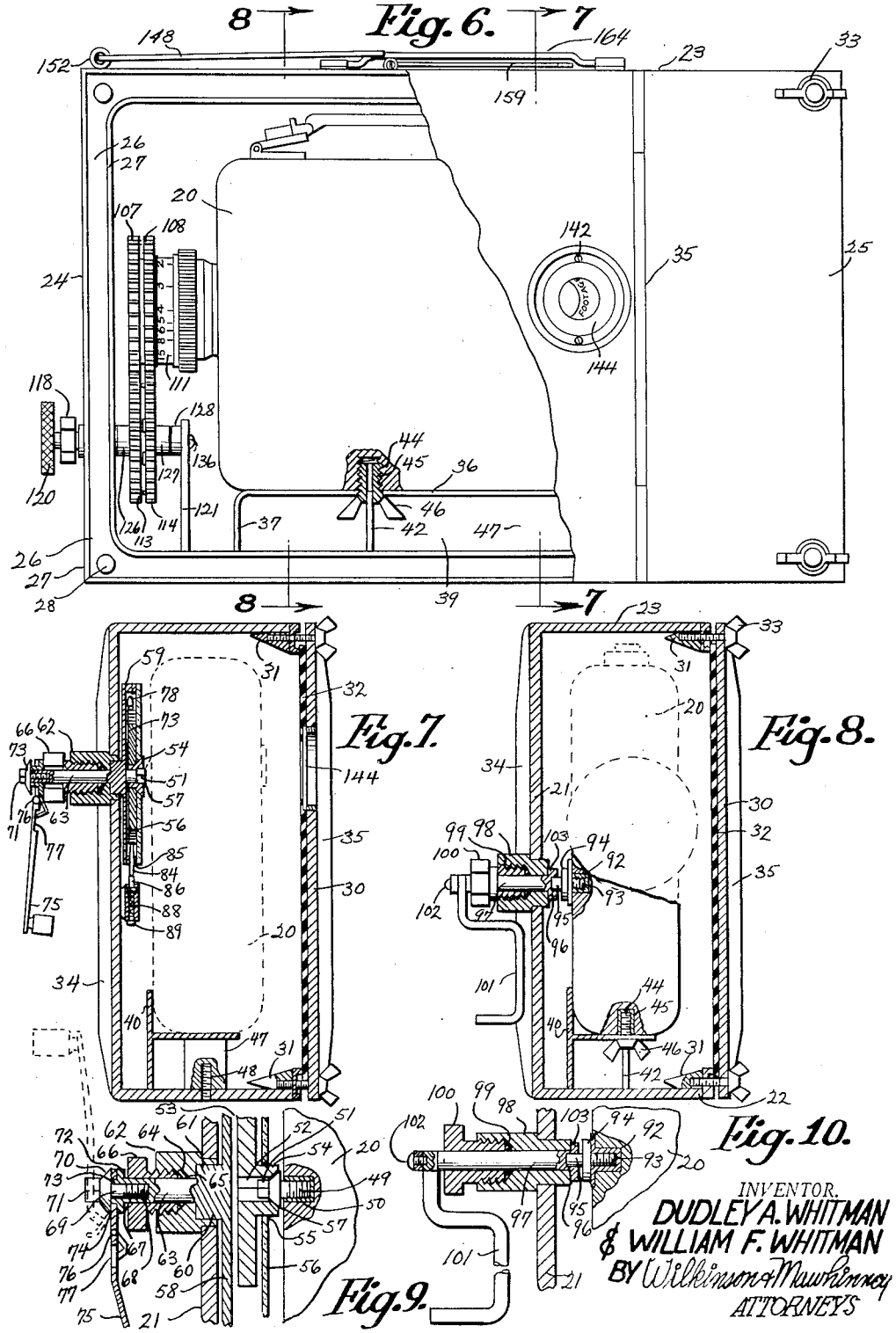

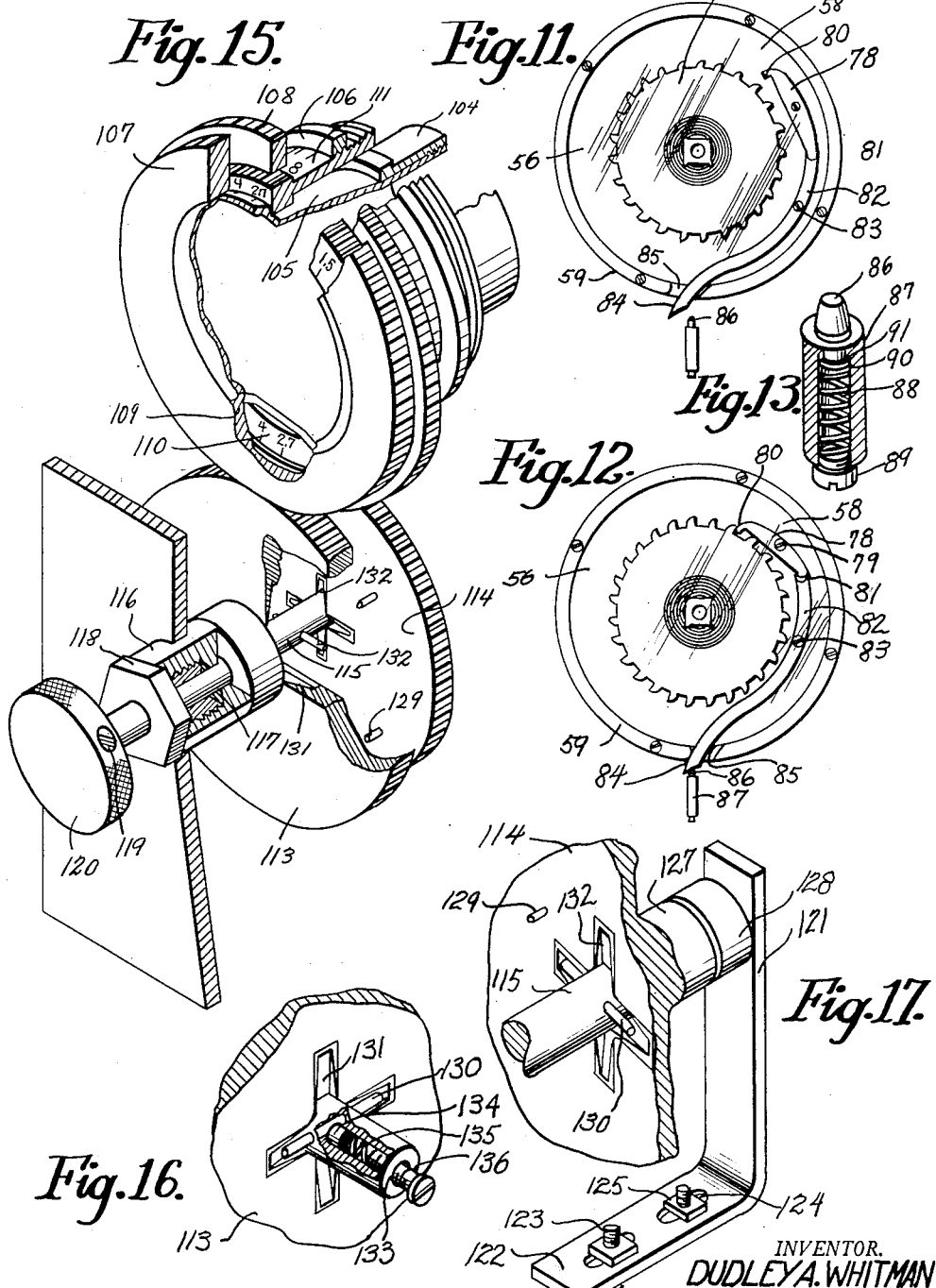

Patented Nov. 6, 1951

2,573,885

UNITED STATES PATENT OFFICE 2,573,885

UNDERWATER CAMERA AND CASING, INCLUDING CONTROL MEANS

Dudley A. Whitman, Miami Beach, and William F. Whitman, Dade, Fla.

Application April 7, 1948, Serial No. 19,506

8 Claims. (Cl. 95—11)

The present invention relates to improvements in under-water cameras and has for its general object to provide a fluid-tight case which is of such a design and construction that any type camera can be carried in the body thereof enabling the camera to be submersible in water and portably carried thereunder for the purpose of taking photographs of marine life, aqueous vegetation and under-water sport activities. Other uses include photographing under hazardous weather conditions, such as hurricanes and severe dust storms, for use in the field of scientific photography where poisonous gases or other aeriform fluids are present which may prove harmful to the photographic film upon their invasion into the camera, the embodiment rendering a more protective and efficient means for taking pictures where ordinary cameras operating under the aforementioned adverse conditions would prove inoperative and unreliable.

Another object of the invention is to provide an improved under-water camera in which a camera, either still or of the motion picture type, is mounted in a liquid and gas-tight manner within an external case, preferably of a material resistant to the corrosive action of water, poisonous gases, etc., and wherein the normal and usual controls of the camera are brought in a water-tight manner through the case to the exterior thereof in such manner that the internally protected camera is operable from the outside of the protective case with viewing openings through the external case whereby the focusing scales of the camera may be observed for correct and proper adjustment and through which the photographing of pictures by the internally sealed camera may be accomplished.

A further object of the invention resides in providing an under-water camera in which an improved winding mechanism for the film wind spring is provided in such manner that the unwinding or run operation of the spring will be relieved of the weight of the majority of the parts and of the packing necessary to make the device waterproof.

A still further object of the invention is to provide an improved stop and start device carried in a wall of the case and coupled to the camera when the camera is correctly placed in the case.

A still further object of the invention is to provide an improved double-acting control for the f stops and the focus which is operable from the forward part of the case adjacent viewing openings through the case whereby the usual scales for this adjustment are observable.

A still further object of the invention is to provide a removable front sight which is also foldable in conjunction with a foldable rear sight.

Other objects of the invention reside in a particular form of folding handle for the case in its relation to the folding rear sight, in the provision of a tripod socket wholly within the case and involving no projections which would interfere with a flush flat bottom for the case, in making water-tight the various external control and operating devices for the camera and in a construction of a removable side cover for the case in its relation to a gasket and knife edge for maintaining a liquid and gas-tight fit all around the edges of this cover.

With the foregoing and other objects in view, the invention will be more fully described hereinafter and more particularly pointed out in the appended claims.

In the drawings, in which like parts are denoted by the same reference characters throughout the several views, Figure 1 is a perspective view of an improved camera case with the side cover plate removed and showing one embodiment of the present invention with the sights and handle folded;

Figure 2 is a perspective view of a form of side cover plate and gasket employed;

Figure 3 is a perspective view of the complete case and cover assembled with the camera therein, taken on a smaller scale, and with the sights raised in a position for taking actual pictures;

Figure 4 is a fragmentary sectional view of a portion of the case and particularly the front wall thereof showing a window construction;

Figure 5 is a fragmentary perspective view of the assembled camera and case showing the front sight separable from its casing;

Figure 6 is a side elevational view, with parts broken away and with parts shown in section, of the complete camera and case assembled;

Figure 7 is a transverse vertical sectional view taken on the line 7—7 in Figure 6;

Figure 8 is a similar view taken on the line 8—8 in Figure 6;

Figure 9 is a fragmentary vertical sectional view, taken on an enlarged scale, through the mechanism for winding the film wind spring;

Figure 10 is a similar view taken through the stop and start device;

Figure 11 is a front elevational view of the drum and ratchet mechanism of the film wind device, illustrating the pawl disengaged;

Figure 12 is a similar view with the pawl engaged;

Figure 13 is a fragmentary perspective view, taken on an enlarged scale, and with parts shown in section, of the trip pin shown in Figures 11 and 12;

Figure 14 is a perspective exploded view of a portion of the spring wind mechanism;

Figure 15 is a fragmentary perspective view of the double-acting control for the f stops and focus;

Figure 16 is a fragmentary perspective view of one of the driver gears with the clutch shown engaged therewith;

Figure 17 is a similar view showing the other gear member clutched to the operating shaft and showing also the bracket support;

Figure 18 is a sectional view taken through the hinged support for the rear sight; and Figure 19 is a perspective view of the plug on which the front sight rotates.

Referring more particularly to the drawings, one form of liquid and gas-tight case is shown in connection with a particular type of camera 20, which in this instance is a 16 mm. magazine movie camera having a usual form of spring film wind, shutter release and focal adjusting mechanism with sights formed in combination with the camera handle and with a usual tripod socket in its base, all of which parts are well known in the art and which will be hereinafter more particularly referred to in connection with the improvements in the liquid and gas-tight case in which the camera 20 is adapted to be housed.

The case, preferably of metal and advantageously of stainless steel, brass, aluminum, or plastics, which will resist the corrosive action of water and poisonous or other gases, comprises a side vertical wall 21, bottom wall 22, top wall 23, front end wall 24 and rear end wall 25; leaving a side, opposite the side vertical wall 21, open for the introduction and removal of the camera 20.

The bottom and top walls 22 and 23 and the front and rear end walls 24 and 25 support a flange 26 which projects for a short distance into the side opening. This flange 26 is offset inwardly of the free edges of the walls 22, 23, 24 and 25 and has at its free edge an outstanding lip or bead 27 which forms with the outer edges of the walls 22, 23, 24 and 25 a continuous gutter which runs all around the side opening of the metal case. The flange 26 forms a support for threaded bolts 28 projecting outwardly therefrom in position to receive and pass through openings 29 in a removable metallic or other non-corrosive and gas resistant cover plate 30. The screws or threaded bolts 28 have their inner ends imbedded in corner anchors 31 lodged in the corners between the flange 26 and the conjunctions of the walls 22, 23, 24 and 25.

A gasket 32 of rubber or other suitable material is interposed between the cover plate 30 and the flange 26 with the side cover plate 30 compressing the gasket 32 over the lip or bead 27 which constitutes in effect a knife edge on which the gasket 32 is impaled in order to make a liquid and gas-tight fit of the side cover plate 30 upon the case. Wing nuts 33 are threaded upon the screws or bolts 28 outwardly of the side cover plate 30 to bind the cover plate and included gasket 32 forcibly and with the desired compression against the flange 26 and its lip or bead 27. The corner anchors 31 and the pull-down screws 28 combine to strengthen the edges of the metal case at the corner portions thereof.

As shown more particularly in Figure 3, compression braces 34 in any suitable number outstand from the external surface of the side vertical wall 21 of the case. These braces 34 allow the case to be made of a light material and still withstand the compression of the water when submerged to a point of use. In other words the braces reinforce and strengthen the wide expanse of the side vertical wall 21. Similar compression braces 35 may be carried by the side cover plate 30 and outstand from the external surface of the same.

Within the case is a camera supporting shelf 36, also preferably made of brass or the like metal, with its end portions downturned to provide front and rear supporting legs 37 and 38. These legs 37 and 38 elevate the camera 20 above a bilge compartment 39. By this construction the camera 20 is mounted several inches above the bottom wall 22 of the fluid-tight case. In case of accidental leakage of water this construction provides a safety factor giving added protection to the enclosed camera.

Upstanding from the shelf is a side camera alignment stop 40 and a rear camera alignment stop 41. The side stop 40 may be integral with the shelf 36 and bent upwardly therefrom. The rear stop 41 is preferably formed from a separate plate of metal secured to the rear leg 38 by welding, brazing or appropriate fastening. The stops 40 and 41 are preferably spaced respectively from the side vertical wall 21 and the rear end wall 25 so as to properly localize and orient the camera 20 in the case with reference to mechanisms mounted through the case side vertical wall 21 to operate the spring film wind and the shutter release and to maintain the camera 20 in a correct position in the case so that its focusing mechanism may occupy a position forwardly of the shelf 36 to enable external operation of the same by an adjusting device mounted through the front end wall 24 of the case.

A guide post 42 mounted upon the bottom wall 22 beneath a forward part of the shelf 36 has its upper end disposed concentrically with an opening 43 in the shelf 36, which opening is of greater diameter than the guide post 42 to enable a tubular screw 44 to slide up and down on the vertical guide post 42 and to pass upwardly through the opening 43 so as to thread into threaded socket 45 usually provided in the base of the camera 20 for receiving the usual tripod. The head of the tubular screw is preferably provided with wings 46 to facilitate manual rotation. As shown in Figure 6 the engagement of the screw 44 in the threaded camera socket 45 rigidly fastens the camera 20 in place after being properly located with reference to the side and rear stops 40 and 41.

Between the bottom wall 22 and the intermediate portion of the shelf 36, a support 47 is arranged which houses a tripod screw socket 48 exposed through the underside of the bottom case wall 22 so that the incased camera may be mounted upon the customary tripod if desired.

Before placing the camera 20 in the metal case, the usual spring film wind handle is removed which is accomplished by first unscrewing the retaining screw 49, from the threaded socket 50 in the side of the camera case, which construction is shown more particularly in Figure 9. The retaining screw 49 is thereupon replaced and the camera introduced into the metal case with the side of the camera 20 carrying the retaining screw 49 foremost so that the square head 51 of the retaining screw 49 is adapted when the camera 20 is correctly placed upon the shelf 36 to come opposite a square socket 52 into which such square head 51 is fitted. The square socket is made in a ratchet wheel 53 having a trunnion ring 54 by which the ratchet wheel is freely rotatable in a bearing opening 55 made centrally in a transparent cover plate 56 of Lucite, mica or other plastic material. The flaring mouth 57 leading to the square socket 52 facilitates the entrance of the square screw head 51 into the square socket 52 in the assembly of the camera 20 into the case. The transparent cover plate 56 is affixed to a pawl carrying drum composed of a disc 58 and a flange 59 extending at right angles inwardly from the peripheral edge of the disc 58. The transparent cover plate 56 is affixed to the inner edge of the flange 59 and also constitutes a part of the drum. The drum is mounted for rotation upon a hub 60 which is journaled to rotate in a bearing 61 in a stuffing box 62 mounted through the side wall 21 of the case. A shaft 63 affixed to the drum hub 60 is journaled to rotate in and through the stuffing box 62 and projects outwardly beyond such stuffing box. A gas and liquid tight packing 64 surrounds the shaft 63 in the stuffing box and is composed in place against a shoulder 65 by a packing gland nut 66.

In the outer end of the shaft 63 is a threaded socket 67 opening through the outer end of such shaft and adapted to receive therein a screw 68 having a blank unthreaded shank portion 69 extending beyond the end of the screw 68 when such screw 68 is turned home in the threaded socket 67. Outwardly beyond the blank shank portion 69 is a screw flange 70 and beyond the screw flange 70 a square head 71.

Rotatably mounted upon the blank unthreaded shank portion 69 is a collar 73 having a flange 72 adapted to abut against the outer end of the shaft 63. The crank carrying plate 74 is a part of the usual spring film wind handle 75 which was previously removed from the camera and is now applied to the novel external mechanism on the case whereby this handle 75 may operate the winding mechanism from the outside of the case. The wind handle 75 is connected with its plate 74 by the usual spring pivot 76 and there is the usual square opening 77 in the wind handle 75 to engage over the square nut head 71 when the wind handle 75 is rotated about its pivot 76 to the position in dotted lines in Figure 9 whereby rotation of the wind handle 75 will impart similar rotation to the drum.

Referring more particularly to Figures 11, 12, 13, and 14 a pawl 78 pivoted at 79 to the drum disc 58 has its toothed end 80 adapted to move radially into and out of engagement with the teeth of the ratchet wheel 53. The heel end of the pawl 78 is rounded and received into a rounded socket 81 formed in the end of a control lever 82 fulcrumed to the drum disc 58. The control lever 82 has a trip finger 84 projected through a slot 85 in the drum flange 59, the slot 85 being so circumferentially elongated as to permit the finger 85 to move between the positions shown in Figures 11 and 12 in the act of moving the control lever 82 and pawl 78 into clutch and declutched positions with respect to the ratchet wheel 53.

A complemental trip stop 86 is in the circular path of the trip finger 84 and as shown in Figure 13 is of frusto conical form. The trip stop 86 is mounted to reciprocate in a casing 87 and is urged yieldingly upward by a coil spring 88. A screw plug 89 closes the lower end of the tubular casing 87 after the pin 86 and spring 88 have been loaded therein, the screw plug 89 also acting to impose the desired tension or load upon the coil spring 88. If desired a flange 90 on the pin 86 may engage a shoulder 91 of the casing to restrict the upward movement of the trip stop pin 86. If desired more than one trip stop pin assembly may be grouped around the circle of the drum if it is desired to trip the pawl 78 before the drum has rotated through the entire 360°.

Referring more particularly to Figures 8 and 10, a shutter release and film wind release extension through the case cover is provided. It will be understood that prior to placing the camera 20 in the case the usual retaining screw holding the start and stop lever is removed and replaced by square headed screw 93. This screw 93 is provided with a flange 94 for engaging against the camera and with a square head 95.

Through the side wall 21 of the metal case is introduced a start and stop or release shaft 97 having in its inner end a socket 96 presented to the square head 95 so that, when the camera 20 is introduced into the case and correctly placed upon the shelf 36, the square head nut 95 of the camera will be assembled to the socket 96 which is also of square cross section.

The shaft 97 is rotatably mounted through a stuffing box 98 having a packing 99 therein surrounding the shaft 97. A gland nut 100 carried by the stuffing box 98 compresses the packing 99 to provide a liquid and gas-tight joint.

The shaft 97 is rotated by the usual or any other form of start and stop or release lever 101 which is affixed in any suitable manner to the outer end of the shaft 97 which projects outwardly beyond the stuffing box 98. In the instance shown a set screw 102 is employed for this purpose. The inner end of the shaft 97 is formed with a head or flange 103 for engaging against the inner end of the stuffing box 98 to prevent the shaft 97 from being pulled out through the stuffing box. This flange also reinforces and strengthens the inner end of the shaft 97 in and about the square socket 96.

Referring more particularly to Figures 15, 16 and 17 and also to Figures 1 and 6, a double-acting control for f stops and focus is provided externally of the case by modifying only slightly the existing f stop and focus controls now found upon this type of camera.

The lens barrel 104 is shown in Figure 15 as being associated in the usual manner with the rotatable f stop sleeve 105 and the independently rotatable focus sleeve 106. Upon the usual knurled rings by which these two sleeves are rotatable in the conventional camera construction, are fixedly mounted respectively a follower f stop gear 107 and a follower focus gear 108. In the front face of the sleeve 107 are cut-outs 109 to reveal the f stop scale 110 on the sleeve 105. The usual index 112 is inscribed upon the outer edge of the sleeve 105 opposite the scale 110 which is usual practice. Upon the outside of the sleeve 106 is the focus scale 111 which also follows usual practice.

The follower gears 107 and 108 mesh respectively with driver gears 113 and 114 mounted to rotate freely about a shaft 115. This shaft is both rotatable and axially slidable through a stuffing box 116 having a packing 117 bound in place tightly about the shaft 115 by a gland nut 118. The stuffing box 116 is mounted in the front wall 24 of the metal case and forms a bearing for the outer end portion of the shaft 115 which projects outwardly beyond the stuffing box for accessibility externally of the case where it has affixed thereon, as by a set screw 119, a control knob 120 by which the shaft 115 may be both rotated and moved axially in and out through the stuffing box.

The inner end of the shaft 115 slides through a bearing bracket 121 having an angularly turned foot 122 for resting upon the bottom wall 22 of the metal case to which it may be affixed in any suitable manner, preferably adjustably by threaded bolts 123 mounted fixedly in the case bottom 22 and projecting upwardly therefrom and through elongated slots 124 in the foot 122. Nuts 125 threaded to the bolts 123 bind upon the foot 122 to hold the bracket 121 in a correct longitudinal position with respect to the shaft for the purpose of maintaining the gears 113 and 114 from axial sliding on the shaft 115. The gears carry hubs 126 and 127 respectively projecting axially therefrom in opposite directions with the hub 126 adapted to engage the inner end of the stuffing box 116 while the rear end of the hub 127, as shown in Figure 17, engages a fixed collar 128 carried by the bracket bearing support 121. One of the gears, for instance 114, is provided with pins or studs 129 projecting laterally therefrom toward the companion gear 113 for maintaining a constant spaced relation between the two gears 113 and 114 without interfering with the independent rotation of the two gears.

It will thus be seen that while the shaft 115 may be subjected to an axially sliding motion the gears 113 and 114 may only rotate and cannot participate in the axial sliding movement of the shaft 115, the gears being held by the stuffing box 116 at one end and by the fixed bracket collar 128 at their other ends.

The shaft 115 in that zone thereof lying between the gears 113 and 114 carries a coupling pin 130, such pin being preferably supported crosswise of the shaft 115 with end portions of the pin projecting diametrically out from the shaft at opposite sides of the latter to be in position to selectively enter keyed slots 131 and 132 made respectively in the adjacent faces of the two gears 113 and 114. By shifting the shaft 115 outwardly the coupling pin 130 is engaged with the keyed slot 131 causing the outer gear 113 to be entrained to rotate with the shaft 115. When the shaft 115 is slid inwardly, the cross coupling pin 130 is disengaged from slot 131 and moved into coupling engagement with slot 132 thus entraining the inner gear 114 to rotate with the shaft 115. In this way a selective clutch arrangement is provided through which by sliding movement of the control knob 120 clutch engagement may be effected of the desired selected gear train, after which the same knob 120 is rotated to effect the adjustment of either the f stops or focus in a desired sequence. The keyed slots 131, 132 may be cruciform preferably to afford a greater opportunity for clutch engagement without having to hunt by rotation of the coupling pin 130 through any considerable angular distance.

The inner end of the shaft 115 is provided with a socket 133 communicating with the coupling pin 130 and having therein a thrust pin 134, a coil spring 135 and a screw 136 which engages threads in the outer portion of the socket 133. By rotating the screw 136 the load of spring 135 may be adjusted as to thrust pin 134 assuring that the same bears with sufficient force against the transverse coupling pin 130 to maintain the same in place and prevent the coupling pin 130 from being dislocated in the cross slot of the shaft 115. This allows thrust pin 134 to be removed without tools enabling quick assembly and disassembly of control gears as in repacking stuffing box, etc.

This entire double-acting control for the f stops and the focus is mounted in the front wall 24 of the case in such position that when a camera equipped with the follower gears 107 and 108 is introduced into the metal case and placed upon the shelf 36 such follower gears 107 and 108 will be brought into intermeshing engagement with the driver gears 113 and 114.

In this position the lens opening of the camera is brought into registry with a window 137 in the front end wall 24 of the case, this window being the photographing window.

As shown in Figure 4 of the drawings, this window comprises a ring frame 138 into which is received a glass or other transparent disc 137. An inwardly turned flange 139 on the inner end of the ring frame 138 receives a liquid and gastight packing ring 140 against which the glass disc 137 is tightly pressed by a screw retaining ring 141 threaded into the outer edge of the ring frame 138. The ring frame 138 is mounted through the front end wall 24 of the metal case. One or more sockets 142 in the ring 141 provide for receiving a tool by which the ring 141 may be rotated into and out of place for the purpose of replacing the glass disc 137.

In the top wall 23 of the metal case is provided a window 143 positioned at the forward portion of the case in registry with the focal scale 111 by which this scale may be observed in the rotary motion of the control knob 120 in the act of focusing the camera. The window 143 may be constructed in the same manner as the window 137 of the front wall in that it is packed to prevent the entrance of water or gases into the case and also provides for substitution of glass discs.

In the side cover plate 30 is a window 144 so located that the footage scale on the camera 29 may be observable through this window 144. As shown in Figure 2 an annular light intensifier 145 is placed on the inside of the side cover plate 30 and inside the gasket 32 and surrounding the window 144. This intensifier may be made of a white paper provided with an adhesive coating to cause the same to adhere to the gasket 32. This intensifier enables the footage scale to be read with increased clarity.

Referring more particularly to Figures 1, 3, 5, 18 and 19, front and rear sights are provided in which the front sight is detachable, the same being carried by a substantially rectangular frame composed of an upper bar 146, side bars 147 and 148 and a lower bar forming a rectangle with the other bars and composed of two sections 149 and 150. These sections are carried respectively by the side bars 147 and 148. Sections are shown in Figure 5 to be separable at their adjacent ends. One end has affixed thereto a cylindrical plug 151 adapted to slide axially into a cylindrical casing 152 welded or otherwise affixed to the top wall 23 of the case at its forward edge. The plug 151 has a socket 153 in its free end to detachably receive the free end of the section 149. The plug 151 and included end of the section 149 are together rotatable in the cylindrical casing 152 so that the front sight 154 carried by the rectangular frame may be raised and lowered.

In the raised position as shown in Figure 3, a pin 155 captive on a chain 156 fastened to the bar section 150 engages through registering openings 157 and 158 in the casing 152 and plug 151 respectively whereby the frame and the front sight are held in erect operative position. This lock pin 155 also holds the plug 151 in the casing 152. By removing the lock pin 155 the plug 151 and end of section 149 may be separated and removed from the casing 152 to provide a detachable front sight.

A rear sight 159, shown more particularly in Figure 18, is carried by a rotary shaft or plug 160 disposed in a casing 161 welded or otherwise secured to the top wall 23 of the metallic case, there being a slot 162 in the casing 161 to permit of the sight 159 folding down against the top wall case 23 as shown in Figure 1 or being elevated to the upstanding position shown in Figure 3, whereby the front and rear sight beads 154 and 159 are in alignment. A screw 163 threaded into the threaded open end of the casing 161 binds against the rotary plug 160 to hold the sight frictionally in adjusted position either up or down. While the rear sight is shown as folding upwardly and forwardly to an operative position, it will be understood that the same may be mounted further to the rear of the case and foldable in a downward and forward direction. The square sight wire frame 146, 147, 148, 149 and 150 outlines the limits of the picture being shot.

The case may be carried by a handle 164 having outturned offset ends 165, 166 rotatably mounted in casings 167 and 168 welded or otherwise fixed to the top wall 23. This arrangement permits the handle to fold down flat against the top wall.

In the use of the device, the film wind mechanism and the release mechanism are mounted permanently in the side wall 21 of the metallic case with square or other non-circular sockets 52 and 96 positioned to receive the square or other non-circular heads 51 and 95 projecting from the lead-in side of the camera 20 as the latter is introduced to the open side of the case when the cover plate 30 is removed, as shown in Figure 2. The square heads are fitted into the sockets in the act of placing the camera 20 upon the shelf 36 and the alignment stops 40 and 41 assist in so orienting the camera 20 that the square heads fit into these sockets.

At the same time the follower gear wheel 107 and 108 are enmeshed with the teeth of the driver gears 113, 114. The screw 44 is engaged in the camera base socket 45 to hold the camera in its final position in the case. The cover is thereupon put in place with the gasket 32 making a water and gas-tight fit with the knife edge. The camera is now ready for use and may be immersed in water or used in gas fields or moisture laden atmospheres.

By swinging the hand crank 75 up about its hinged connection 76 so that the non-circular opening 77 engages the non-circular nut head 71 and thereupon rotating a crank 75, the film wind spring of the camera may be wound. This is accomplished by rotating the crank handle 75 in the usual right hand turn direction viewed from the exterior face of the side wall 21 of the case. From the view point of Figures 11 and 12 this will cause the drum carrying the pawl 78 to rotate in a counter-clockwise direction. The pawl 78 being normally in disengaged position, as shown in Figure 11, no motion will be transmitted to the ratchet wheel 53 until substantially one revolution of the drum is made whereupon the trip finger 84 will encounter the trip stop pin 86. Due to the conical frame of the pin 86 and the beveled end of the trip finger 84 the finger will slide over the pin but only after the finger has been moved through slot 85 from the position of Figure 11 to that of Figure 12. In this position the trip finger will be arrested from further swinging movement about the fulcrum 83 and it will therefore depress the pin 86, compressing the spring 88 in so doing in order that the trip finger 84 may pass the pin 86. In executing this movement the pawl 78 will be engaged with the ratchet wheel 53 so that continued turning of the external crank handle 75 will result in the carrying around of the ratchet wheel with the drum which will cause winding of the spring mechanism through the square headed screw 51.

After the spring has been wound the crank handle 75 is released whereupon the usual spring associated with the hinge 76 will spring the handle to the disengaged position shown in Figure 3.

When the camera runs, that is when the film spring unwinds, the entire unit comprising the ratchet wheel 53 and the drum rotate together because the pawl 78 remains engaged with the ratchet wheel, but this engagement continues only until the trip finger 84, now rotating clockwise, as viewed in Figures 11 and 12 strikes the conical surface of the pin 86 by which the trip finger is shifted to the right hand end of the slot 85. In this rotational sense the trip finger 84 cannot pass the pin 86 and therefore the parts 84, 86, not only cause disengagement of the pawl 78 from the ratchet wheel 53 but also act as a stop to prevent further rotational movement of the drum while allowing the film spring to continue its unwinding operation which drives the camera. This disengaging operation is important in allowing the film spring and the friction free run, that is a run without entraining therewith the shaft 63 which is under the frictional resistance of the packing 64. The ratchet wheel 53, of course, is permanently locked by reason of its square socket 52 engaging the nut 51 with the film wind spring and thus the ratchet wheel 53 rotates at all times during the unwinding of the film spring but this ratchet wheel is mounted entirely within the case and is not subject to the friction drag of the packing.

This friction free disengaging winding unit has a number of advantages and in the first place it overcomes stuffing box drag, which makes the camera run below normal speed; in the second place it relieves any weaving or movement of the camera in the fluid tight case (while camera spring unwinds) due to faulty alignment; in the third place, it engages and disengages automatically (relieving one of remembering to manually engage and disengage winding crank); in the fourth place it stops the winding crank handle from revolving as camera unwinds; and in the fifth place the crank handle is ready for winding at all times.

In taking a picture the sights are elevated as shown in Figure 3 and assuming that the film spring has been wound, the focusing mechanism is adjusted by observation through the windows 137 and 143 while sliding and rotating the control knob 120 as hereinbefore described to cause the f stops and the focus to be properly adjusted. The object is then sighted and when correctly viewed the start and stop lever 101 is pressed down to free the film spring and shutter release.

It will be noted that the double acting control for the f stops and focus not only makes possible the performing of the two functions with a single control, giving complete lens adjustment, but also simplifies the construction in that this duplex control is accomplished through a single shaft and a single stuffing box and associated parts.

It will be understood that while the invention has been illustrated and described with reference to square head screws and square headed sockets the same may be of any straight lined or non-circular form to constitute a driving fit between the same.

As shown in Figure 7, the leak-proof threaded socket 48 for attaching the camera and case to a tripod is made flush with the bottom wall 22 thereby allowing the camera to be placed upon a flat supporting surface or table without tipping over.

It will be appreciated that the invention provides a water-tight and air-tight case capable of holding a number of popular and professional motion picture and still picture cameras in such a way as to be able to fully control camera adjustments from without the case. It will further be appreciated that the device is so designed that film can be changed without removing the camera from the case. The case is small, compact and highly portable, enabling hand held underwater camera shots with both professional and amateur cameras. The case is constructed in such a way as to make possible the conversion of a regular camera for underwear use in a minimum of time without any changes being made on the camera itself and without the use of tools.

Modification and design may be suited to the individual type of camera. The purpose of the invention is to overcome adverse conditions which would otherwise make picture taking most difficult, if not impossible.

The improved underwater camera can be used:

In the first place underwater, for marine surveys, entertainment pictures and scientific studies; in the second place when poisonous gases are present that might be harmful to film or camera; in the third place for radio active and atomic research, to be constructed of lead and yet remain compact and portable; and in the fourth place as a protection from the elements when photographing storms at sea, during heavy rain or spray as in hurricanes, during dust storms, during volcanic ash eruptions, etc.

It is obvious that various changes and modifications may be made in the details of construction and design of the above specifically described embodiment of this invention without departing from the spirit thereof, such changes and modifications being restricted only by the scope of the following claims.

What we claim is:

1. For use with a conventional camera having a lens, "f" stop adjusting mechanism, a shutter release and a film wind device, an underwater liquid and gas-tight case, a raised support in said case adapted to removably receive and support said camera above the bottom of said case and having parts to locate and orient the camera in the case, a photographing window in the case with which the camera lens registers in the oriented position of the camera in the case, a film wind operating device mounted in a fluid-tight manner through the case and having a part interlockingly receiving the camera film wind device in the oriented position of the camera in the case, a shutter release operating device mounted in a fluid-tight manner through the case and having a part adapted to interlock with the camera shutter release, and an operating device for the "f" stop adjusting mechanism of the camera mounted in a fluid-tight manner through the case and adapted to be coupled to the camera "f" stop adjusting mechanism in the oriented position of the camera, said film wind operating device having a drum rotatable internally of the case, a pawl pivotally carried by the drum and engageable with a ratchet wheel rotatable freely of the drum and having a coupling non-circular socket exposed on the interior of the case, and a non-circular coupling head affixed to the camera film wind device and adapted to occupy said socket in the oriented position of the camera, an operating lever being coupled to the pawl and having a trip finger in the path of a depressible trip pin.

2. For use with a conventional camera having rotatable f stop and focus adjusting sleeves with the usual scales, an under-water case adapted to removably receive the camera, a photographing window in said case, a support for the camera in the case having means to register the camera with the photographing opening for the taking of photographs therethrough, follower f stop and focus gears affixed respectively to the f stop and focus sleeves, driver gears separately meshing with said f stop and focus follower gears, a shaft rotatably and slidably mounted through the case adjacent the window, a clutch device between said shaft and said driver gears for selectively coupling either gear to rotate with said shaft.

3. The combination of claim 2 characterized by the fact that the clutch device comprises a cross pin carried by the shaft between the two driver gears adapted to move into keyed slots in the adjacent faces of the driver gears.

4. The combination of claim 2 characterized by the fact that the photographing window is in the front wall of the case and that the top wall of the case has a window for observing the focus scale, the f stop scale being observable through the photographing window.

5. For use with a camera having a film wind device, an under-water case adapted to receive said camera, and a mechanism extending through the wall of the case for operating the camera film wind device comprising a shaft journaled through the wall of the case, a stuffing box in the case wall through which the shaft passes, an external operating handle for the shaft, a drum in the case affixed to rotate with the inner end of the shaft, a pawl carried by said drum, a ratchet wheel positioned to be engaged by said pawl and rotatably mounted independently of the drum, complemental coupling members between said ratchet wheel and the film wind device of the camera, and a trip device for shifting said pawl into and out of engagement with said ratchet wheel.

6. For use with a conventional camera having rotatable f stop and focus adjusting sleeves having thereon the usual scales, an under-water case adapted to removably receive the camera, a photographing window in said case, means for supporting said camera in said case registering the camera with said photographing opening for the taking of photographs therethrough, follower and focus means affixed respectively to said f stop and focus sleeves, driving means separately meshing with said f stop and focus follower means, actuating means for said driving means rotatably and slidably mounted through the case adjacent said photographing window, and clutching means between said actuating means and said driving means for selectively coupling either of said follower or focus means to rotate with said actuating means.

7. An under-water case for cameras as claimed in claim 6 characterized by the fact that said clutching means between said actuating shaft and said driving means is a coupling pin carried by said driving means adapted to seat within a complemental recess in said driving means and to upon rotation of said actuating means impart simultaneous movement to said driving means.

8. An under-water case for cameras as claimed in claim 7 further comprising a window in the top wall of said case for observing the focus scale.

DUDLEY A. WHITMAN.
WILLIAM F. WHITMAN.

REFERENCES CITED

The following references are of record in the file of this patent:

UNITED STATES PATENTS

| Number | Name | Date |
|---|---|---|
| 1,156,441 | Stearns | Oct. 12, 1915 |
| 1,739,113 | Azarraga | Dec. 10, 1929 |
| 2,001,083 | Jackman | May 14, 1935 |
| 2,088,714 | Mitchell | Aug. 3, 1937 |
| 2,241,248 | Drotning | May 6, 1941 |
| 2,256,207 | Leitz et al. | Sept. 16, 1941 |
| 2,334,075 | Davenport | Nov. 9, 1943 |
| 2,369,199 | Aiken | Feb. 13, 1945 |
| 2,414,083 | Borden | Jan. 14, 1947 |
| 2,487,868 | Grigsby | Nov. 15, 1949 |

FOREIGN PATENTS

| Number | Country | Date |
|---|---|---|
| 603,243 | France | Jan. 7, 1926 |
| 744,934 | France | Jan. 31, 1933 |
| 667,975 | Germany | Nov. 24, 1938 |

OTHER REFERENCES

"Undersea Photography," article in Journal of Society of Motion Picture Engineers, vol. 32, January 1939, pages 3–17.